May 23, 1972 L. W. GIBNEY 3,664,789
ROTARY EXTRUSION DIE
Filed May 12, 1971 3 Sheets-Sheet 1
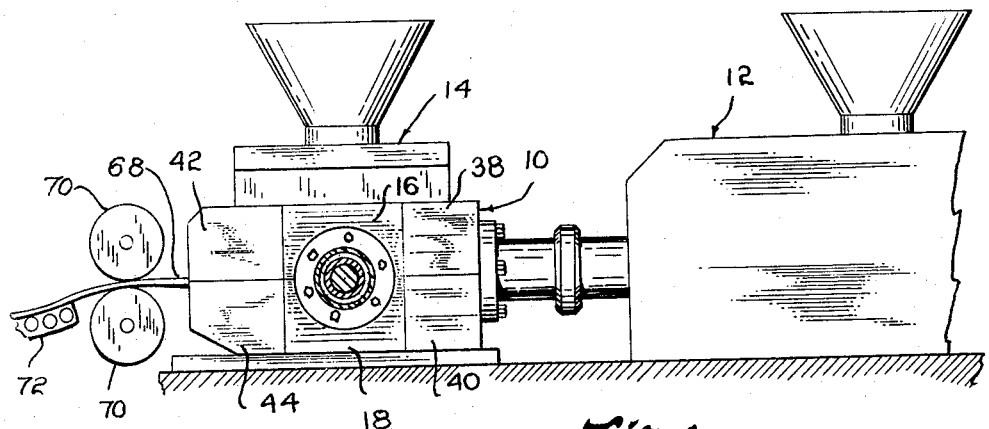
Fig. 1
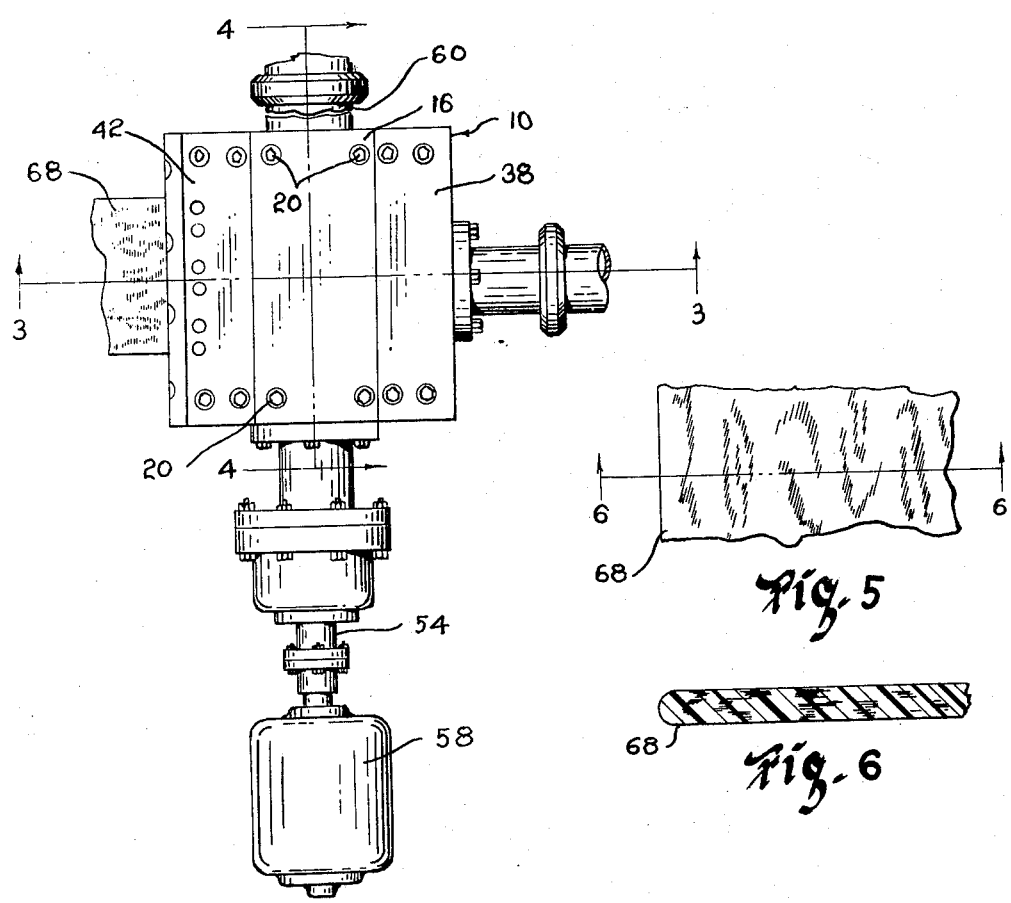
Fig. 2
Fig. 5
Fig. 6
INVENTOR.
LLOYD W. GIBNEY
BY
ATTORNEY

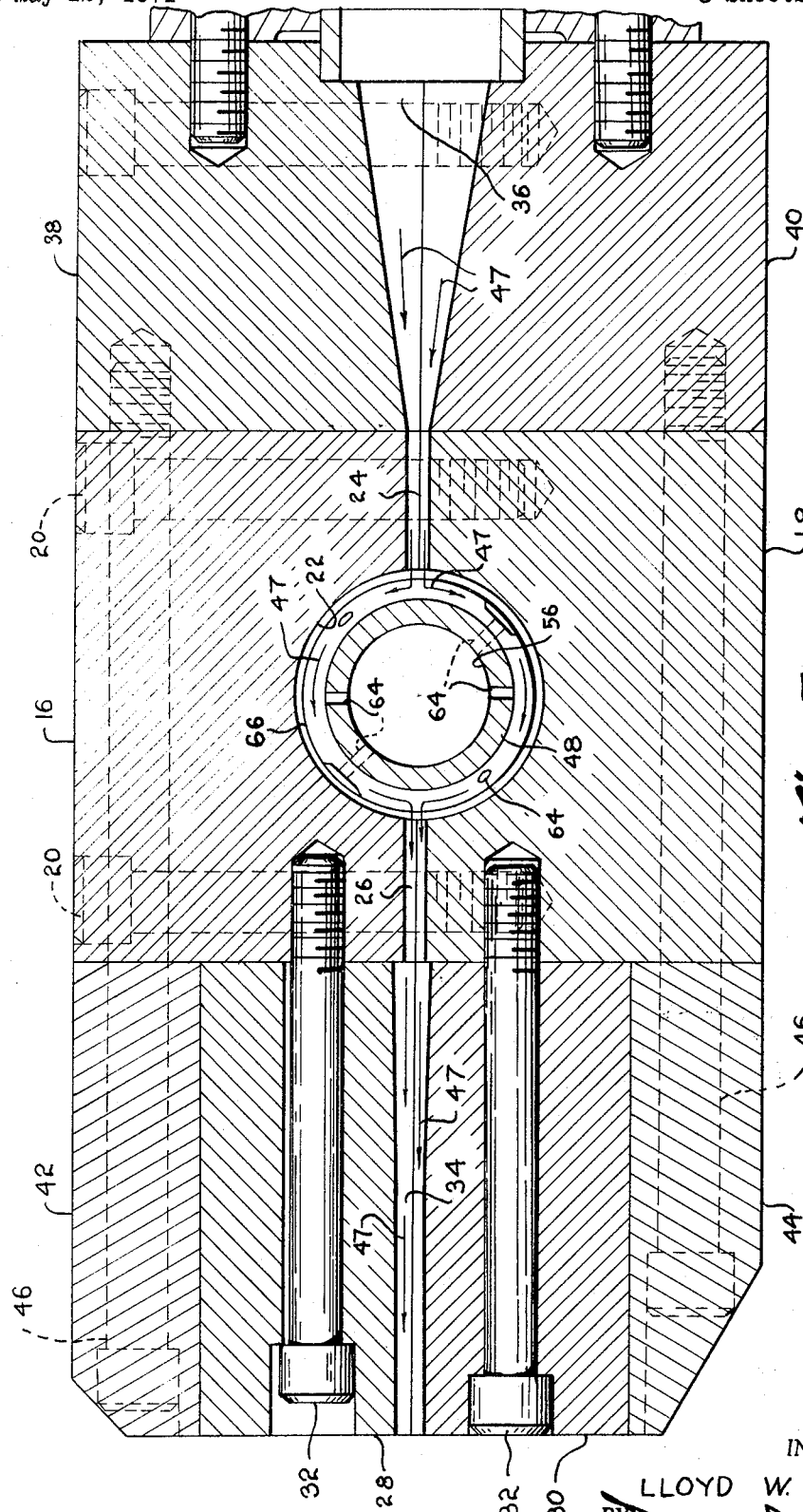

INVENTOR.
LLOYD W. GIBNEY
BY Dorothy T. Williams
ATTORNEY

United States Patent Office

3,664,789
Patented May 23, 1972

3,664,789
ROTARY EXTRUSION DIE
Lloyd W. Gibney, Funkstown, Md., assignor to American Optical Corporation, Southbridge, Mass.
Continuation of abandoned application Ser. No. 809,527, Mar. 24, 1969. This application May 12, 1971, Ser. No. 142,804
Int. Cl. B29f 3/12
U.S. Cl. 425—131                  6 Claims

ABSTRACT OF THE DISCLOSURE

A die for extruding variegated plastic sheet stock wherein an inlay of preselected color extends through the thickness of the extrusion in a continuously repetitive pattern of predetermined configuration with provision for altering the pattern without interruption of the flow of the extrusion. The die receives a main supply of heat-softened plastic of a pre-selected base color which is interspersed with a differently colored heat-softened plastic material directed laterally into the die cavity through a rotary distribution tube in controlled amounts and locations across the main supply.

---

This application is a continuation of Ser. No. 809,527, filed Mar. 24, 1969, now abandoned.

BACKGROUND OF THE INVENTION

Field of the invention

Plastics extrusion dies particularly of the type used to produce variegated extrusions.

Description of the prior art

Heretofore in the extrusion of parti-colored plastic sheet materials, the industry has been seriously limited by its inability to overcome linear laminar effects, blotchy appearances and harsh patterns. Such sheet stock is not particularly pleasing in appearance and, accordingly, has only a limited usefulness. Manufacturers of high quality eyewear, for example, require a plastic sheet stock in which its colors and patterns are smoothly blended throughout the thickness of the stock in configurations which are so regulated as to be readily reproducible for standardization of color and pattern.

The inability to obtain smoothly blended variegated extruded sheet stock in reliably standardized patterns has, heretofore, forced spectacle frame manufacturers and others to turn to suppliers of block-formed sheet stock for quality color blending and duplication of pattern.

Block-formed plastics are extremely costly in that their manufacture requires long, tedious and skillfully handled operations including the extrusion of long and thin strips of differently colored plastics, individual handling and arranging of such strips in particular side-by-side relationships with each other according to the ultimate design desired in the sheet stock, long hours of heating the assemblies for fusing and blending of all strips and careful transverse cutting of the fused block into sheet stock. Accordingly, spectacle frame manufacturers and others requiring such sheet stock are burdened with high material costs and limited supplies resulting from the long and tedious operations.

The present invention overcomes problems relating to supply and more particularly to the high cost of quality smoothly blended variegated plastic sheet stock by making it possible to extrude smoothly blended variegated sheet stock in an infinite number of patterns all of which extend completely through the stock and are readily reproducible.

SUMMARY OF THE INVENTION

Variegated plastic sheet stock having smoothly blended patterns of preselected color extending completely therethrough is produced according to principles of the present invention through the provision of a novel rotary extrusion die wherein a main supply of plastic material of one color is directed into one end of the die. Transversely of the flow of said main supply within the die, a rotary distribution tube receives and injects a differently colored plastic material into the main flow along the width and throughout the thickness thereof in amounts and at locations controlled according to the design characteristics desired to be produced in the ultimate extrusion.

The rotary distribution tube is provided with lateral openings and external flights, the latter being formed by a series of relatively deep circumferential V-shaped grooves along its length wherewith the differently colored plastic material is smoothly blended into the main plastic flow. Patterns produced by such introduction of the differently colored plastic material are controlled by the speed and direction of rotation of the distribution tube, variations in either or both of which may be utilized to alter the pattern of color distribution.

Rotary distribution tubes having different shapes, sizes and locations of external flights and/or openings through their sides may be interchangeably used in the die structure to offer an even greater selection of patterns.

Details of the present invention will become more fully understood by reference to the following description and the accompanying drawing.

DESCRIPTION OF THE DRAWING

FIG. 1 is a fragmentary side elevational view of an embodiment of the invention;

FIG. 2 is a top plan view of the embodiment of the invention shown in FIG. 1;

FIG. 3 is a cross-sectional view taken generally along line 3—3 of FIG. 2;

FIG. 5 is a fragmentary plan view of an extrusion formed according to principles of the present invention; and FIG. 6 is a fragmentary cross-sectional view taken along lines 6—6 of FIG. 5.

DESCRIPTION OF THE PREFERRED EMBODIMENTS

Figure 4:
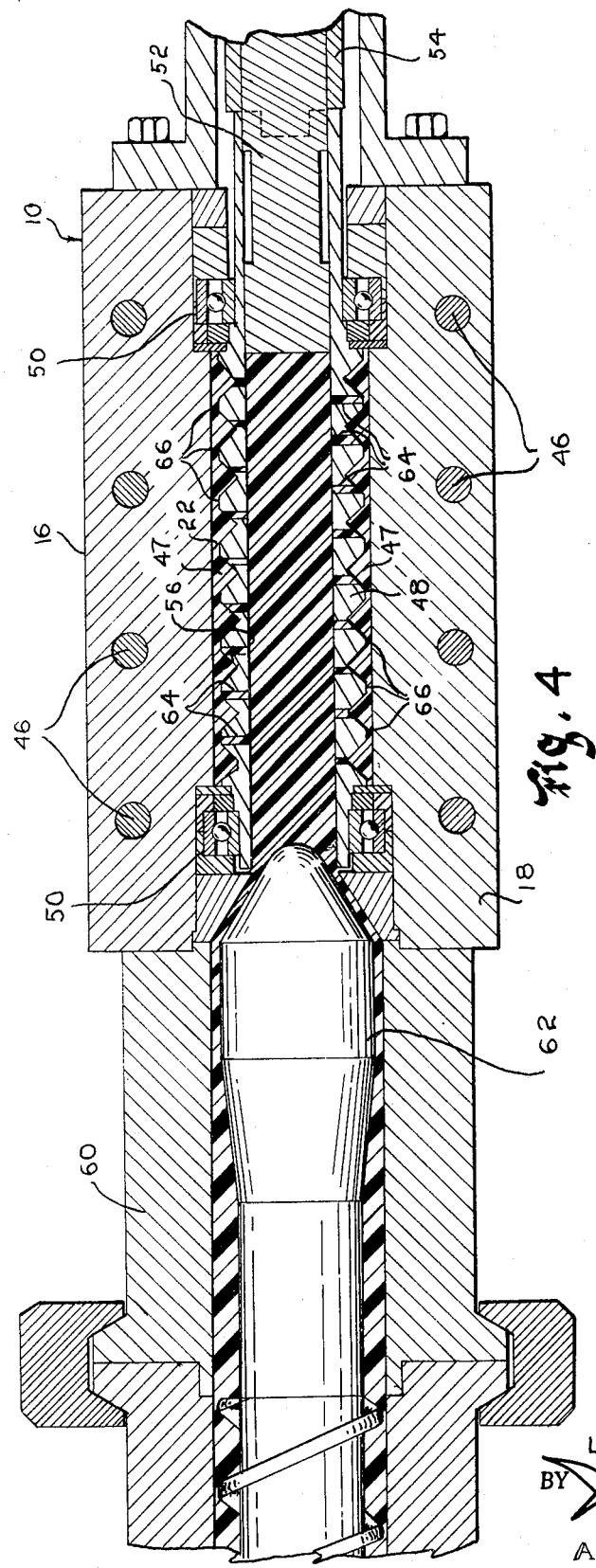
FIG. 4 is a cross-sectional view taken generally along line 4—4 of FIG. 3.

Rotary extrusion die 10, coupled to extruders 12 and 14, receives a main supply of heated plastic material from extruder 12 and a secondary supply of similarly heated plastic material from extruder 14 (see FIGS. 1 and 2).

Extruders 12 and 14 which may be of any suitable conventional design or type are not considered as being a part of the present invention. They are shown in diagrammatic form only for the purpose of better illustrating the functional characteristics of extrusion die 10 to which the present invention is particularly directed.

Referring more particularly to FIGS. 3 and 4, it will be seen that the main body structure of extrusion die 10 includes a number of die blocks all securely fastened together so as to form an internal plastic extrusion cavity. The assembly of die blocks is made with removable threaded studs so that the die can be disassembled for cleaning. Upper and lower die blocks 16 and 18 respectively are connected with a number of studs 20 (see FIGS. 2 and 3) and, when so assembled, semi-circular recesses in each of die blocks 16 and 18 become mated to form a transverse circular channel through the assembly of blocks 16 and 18. Rectilinear recesses in each of the blocks which extend toward and away from each other right angularly from the semi-circular recesses to corresponding opposite edges of the blocks from passageways 24 and 26 respectively leading to and from circular channel 22.

Upper and lower die lips 28 and 30 respectively are secured to the assembly of blocks 16 and 18 by studs 32. They form the extrusion oriface 34 of die 10 which is of a cross-sectional configuration corresponding to the size and shape desired of the plastic extrusion to be produced by die 10. Entrance port 36 is formed between upper and lower die blocks 38 and 40 which are secured to the assembly of blocks 16 and 18 along with oppositely disposed upper and lower die blocks 42 and 44 by elongated studs 46.

Entrance port 36, passageway 24, circular channel 22, passageway 26 and extrusion oriface 34 form a main flow passage through die 10 along which a main flow of heated plastic material is directed during operation of the die. This flow of plastic material is represented by arrows 47 in FIG. 3.

Extending coaxially through transverse channel 22 is rotary distribution tube 48 (FIGS. 3 and 4) which is journaled for rotation in channel 22 by bearing means 50 adjacent its opposite ends (see FIG. 4). Inner and outer couplers 52 and 54 respectively seal one end of tubular cavity 56 within distribution tube 48 and connect tube 48 to drive motor 58. Tube 48 is rotated by coupler 54 during the operation of die 10.

Adaptor 60 adjacent the opposite end of distribution tube 48 connects extruder 14 to die 10 and a secondary supply of heated plastic material is directed around restrictor 62 into cavity 56 within distribution tube 48. Plastic material thus directed into tube 48 is introduced into the main flow of plastic through openings 64 in the side of tube 48. In order to achieve a blending of the plastic material so introduced into the main flow, the external surface of tube 48 is further provided with a series of annular ridges of an inverted V-shaped cross-sectional configuration which will be referred to hereinafter as flights 66. The flow of plastic material through at least some of openings 64 is caused to be somewhat spread and sliced or blended into the main plastic flow by flights 66 during rotation of distribution tube 48.

It should be understood that the number, size and locations of openings 64 in tube 48 as well as the size, number and shape of flights 66 may be varied according to the types of configurations of patterns desired to be produced by the secondary plastic material. Accordingly, the present illustration of tube 48 is exemplary of only one of an infinite number of shapes, sizes and positional arrangements of opening 64 and flights 66 which may be used according to principles of the present inventive concept.

In the operation of die 10, a heat softened flowable supply of colored or transparent plastic material such as cellulose acetate is fed under pressure from extruder 12 into entrance port 36, through passage 24 and into circular channel 22 wherein it is caused to dividedly flow around distribution tube 48 and become recombined adjacent the entrance end of passage 26. The recombined flow then enters extrusion oriface 34 wherein it is shaped to the thickness and width desired of the extrusion and emitted from oriface 34 as a continuous sheet.

As the main flow of plastic is divided by distribution tube 48 in circular channel 22, the secondary and usually differently colored plastic material being emitted through openings 64 in tube 48 is, in effect, introduced centrally of the overall thickness of the main flow of plastic in directions radially of distribution tube 48 toward upper and lower surfaces of the main flow of plastic material. In this way, the secondary or differently colored plastic material is interspersed throughout the entire thickness of the main flow in a smoothly blended fashion and in amounts and locations along the width of the main flow determined according to the speed and direction of rotation of distribution tube 48. The speed and direction of rotation may be changed to produce corresponding changes in the design or pattern of the secondary or differently colored plastic. Such changes in pattern or design produced in extrusion 68 (FIGS. 1, 2, 5 and 6) may be effected without interruption of the extruding operation. Still further variations of pattern may be effected by replacement of tube 48 with one of different construction with respect to the size, shape and locations of openings 64 and flights 66.

Immediately following its emission from die 10, extrusion 68 is cooled to a dimensionally stable condition by cooling rollers 70 (FIG. 1) and is further air-cooled by passage along conveyer 72 whereupon it is cut transversely into lengths which are convenient for storage and handling.

I claim:

1. A die for extruding variegated plastic sheet stock comprising:
    a main body structure having a principal flow passage extending substantially centrally therethrough, said structure having an entrance port adjacent one end of said passage and an extrusion orifice adjacent the other end of said passage for respectively receiving and emitting a main flow of heat softened plastic material introduced under pressure into said entrance port and a circular channel extending transaxially of said passage;
    a rotary distribution tube journaled for rotation in said channel, one end of said tube being adapted to receive a secondary flow of heat softened plastic material under pressure, said tube having a succession of annular projecting flights along the length thereof separated from one another by intermediate valleys and a multiplicity of openings in the side of said tube at least some of which extend through some of said flights for directing the plastic material of said secondary flow into said principal flow passage for interspersion in said main flow of plastic material; and
    means for rotating said distribution tube for effecting a coalescence of said main and secondary plastic materials with distinctive patterning of said secondary material in the main material.

2. A die according to claim 1 wherein said openings in the side of said tube are randomly interspersed along the length of said tube.

3. A die according to claim 2 wherein said annular flights are of an inverted V-shape and certain of said openings extend through said tube intermediately of said flights, others of said openings extend through one or more sides of said flights and still others of said openings extend through apices of said flights.

4. A die for extruding variegated plastic sheet stock comprising:
    a main body structure having a principal flow passage extending substantially centrally therethrough, said structure having an entrance port adjacent one end of said passage and an extrusion orifice adjacent the other end of said passage for respectively receiving and emitting a main flow of heat-softened plastic material introduced under pressure into said entrance port and a circular channel extending transaxially of said passage;
    a rotary distribution tube journaled for rotation in said channel, said tube having a maximum outer diametral dimension smaller than that of said circular channel whereby said main flow of heat-softened plastic material is permitted to flow transaxially of said channel circumferentially about said tube from said entrance port into said extrusion orifice, one end of said tube being closed and the opposite end thereof being adapted to receive a secondary flow of heat-softened plastic material under pressure, said tube further having a multiplicity of openings extending through its side for directing the plastic material of said secondary flow into said principal flow passage for interspersion into said main flow of plastic material; and means for rotating said distribution tube for effecting a coalescence of said main and secondary plastic materials with distinctive patterning of said secondary material in the main material.

5. A die according to claim 4 wherein said openings in said side of said tube are randomly disposed along the length of said tube.

6. A die according to claim 4 wherein said openings in said tube are disposed in a predetermined regular geometrical pattern along the length of said tube.

References Cited

UNITED STATES PATENTS

| | | | |
|---|---|---|---|
| 2,803,041 | 8/1957 | Hill et al. | 18—13 P |
| 3,274,646 | 9/1966 | Krystof | 18—13 P |
| 2,479,261 | 8/1949 | Reetz | 18—13 P X |
| 3,477,099 | 11/1969 | Lee et al. | 18—13 P |

J. SPENCER OVERHOLSER, Primary Examiner

U.S. Cl. X.R.

264—245; 425—381